United States Patent [19]

Holler et al.

[11] 4,383,172
[45] May 10, 1983

[54] METHOD AND APPARATUS FOR MEASURING COATING THICKNESSES ON CONTINUOUSLY MOVING MATERIAL

[75] Inventors: James A. Holler; William B. Stanton; Jerry J. Spongr, all of Tonawanda; Boris B. Joffe, Buffalo; Peter W. Raffelsberger, North Tonawanda; John E. Tiebor, Williamsville, all of N.Y.

[73] Assignee: Twin City International, Inc., Amherst, N.Y.

[21] Appl. No.: 227,920

[22] Filed: Jan. 23, 1981

[51] Int. Cl.³ ............................................ G01N 23/00
[52] U.S. Cl. ................................................... 250/308
[58] Field of Search ................... 250/308, 358 R, 359, 250/360, 234; 73/159

[56] References Cited

U.S. PATENT DOCUMENTS

| | | | |
|---|---|---|---|
| 3,115,577 | 12/1963 | Joffe et al. | 250/308 |
| 3,132,248 | 5/1964 | Eggebraaten et al. | 250/308 |
| 3,474,668 | 10/1969 | Mangan | 73/159 |
| 3,529,158 | 9/1970 | Joffe et al. | 250/472 |
| 4,190,770 | 2/1980 | Saunders et al. | 250/308 |

FOREIGN PATENT DOCUMENTS 1084180 9/1967 United Kingdom.

OTHER PUBLICATIONS

"Continuous Strip Monitor", UPA Technology, Inc. (Brochure).
"Strip Monitor", *Materials Evaluation,* Sep. 1978, pp. 87-88 (Magazine Article).
"Betascope CC950 Cont", Fischer Instrumentation (Brochure).

*Primary Examiner*—Alfred E. Smith
*Assistant Examiner*—Janice A. Howell
*Attorney, Agent, or Firm*—Christel, Bean & Linihan

[57] ABSTRACT

A method and apparatus using radiation techniques for measuring coating thicknesses on continuously moving strip material as it travels along a predetermined path and without altering that path. A shuttle carrying a measuring probe having a radioactive isotope source and a detection device is provided in the path of the strip for reciprocation along a preselected segment of the path. The shuttle and the probe are releasably engaged with the strip and carried thereby for synchronous movement therewith in the direction of travel of the strip during a measurement cycle, and are disengaged from the strip when no measurement is being made, the movement of the shuttle then being controlled by an independent drive mechanism.

22 Claims, 21 Drawing Figures

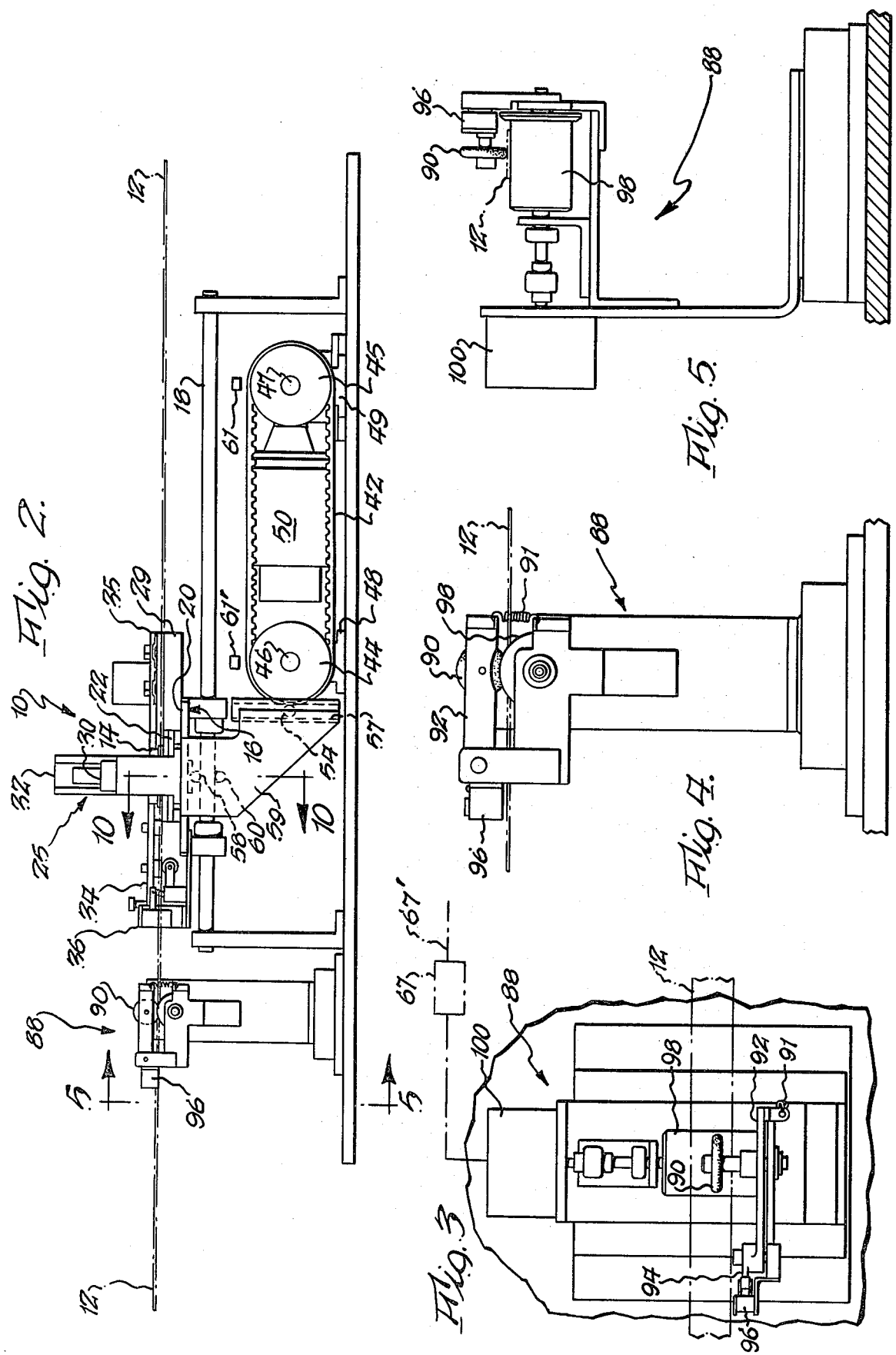

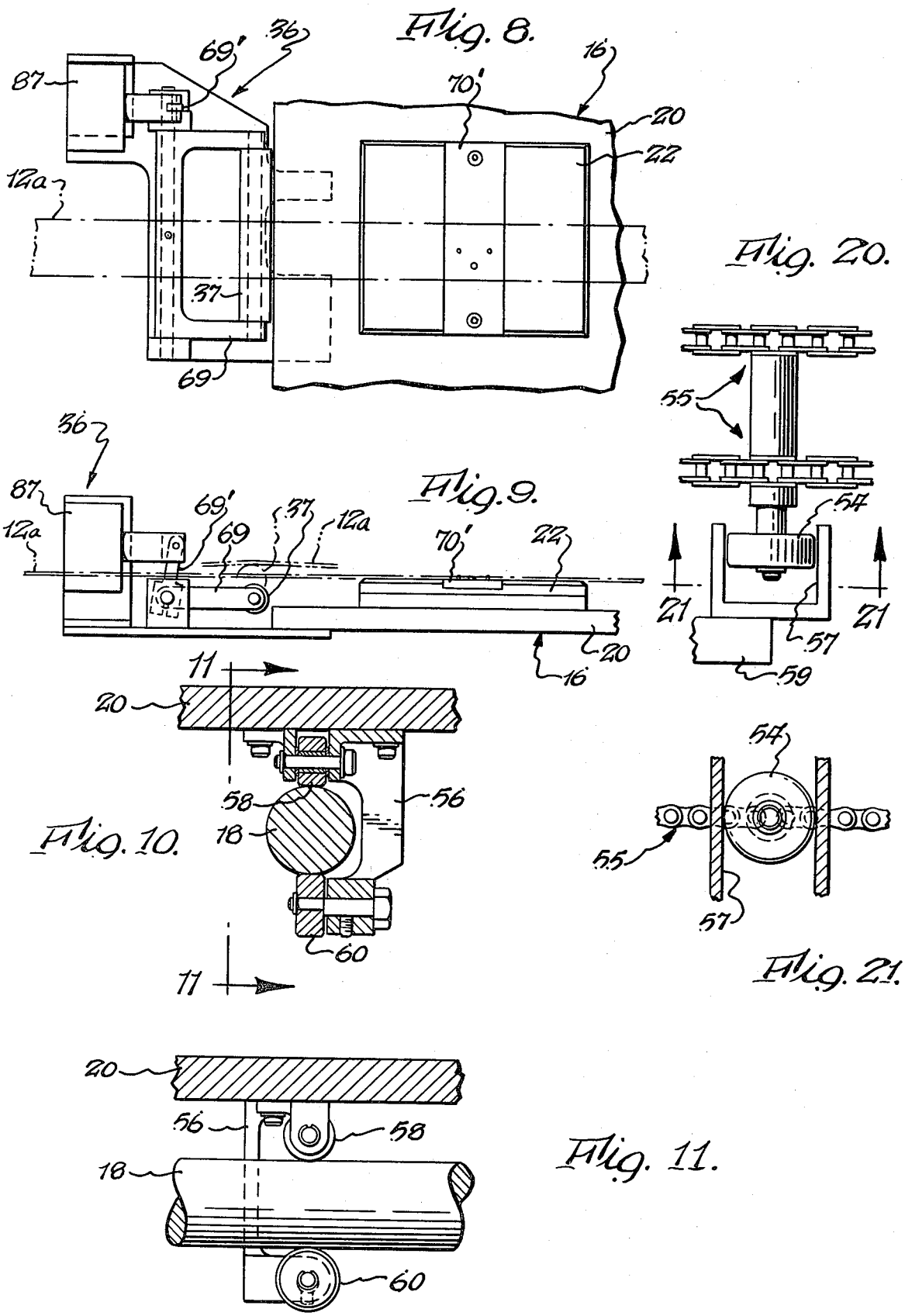

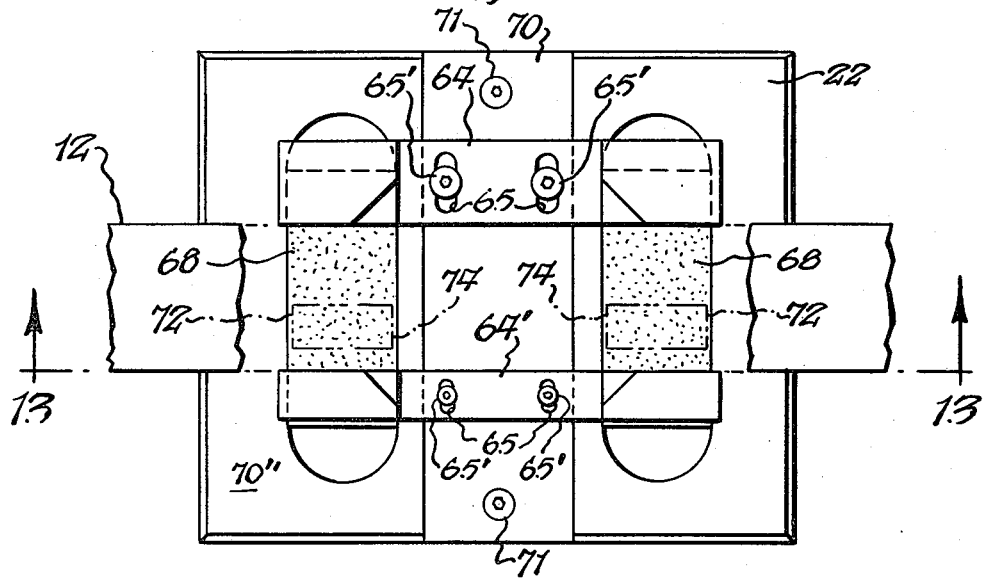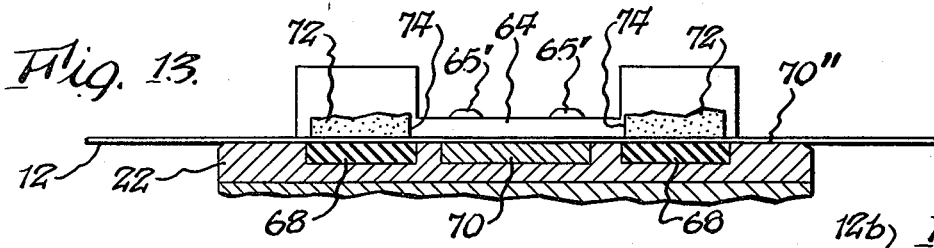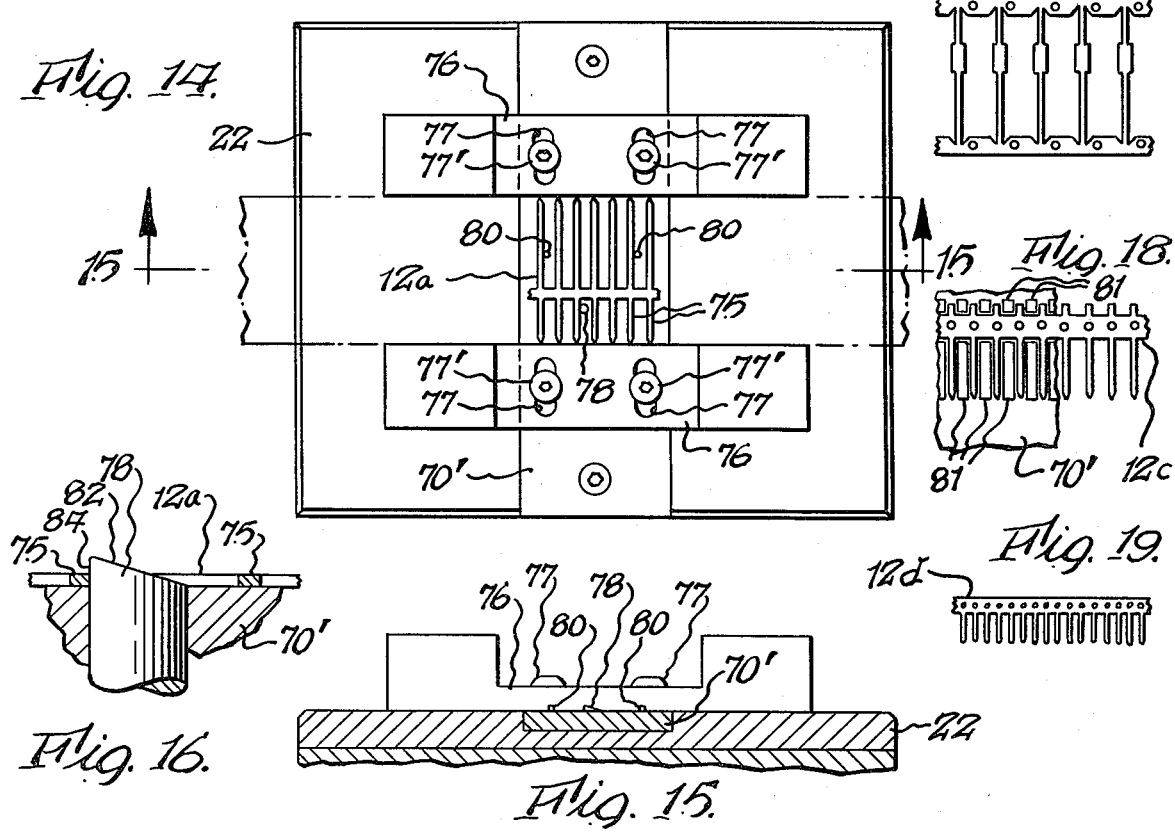

METHOD AND APPARATUS FOR MEASURING COATING THICKNESSES ON CONTINUOUSLY MOVING MATERIAL

BACKGROUND OF INVENTION

This invention relates generally to the measuring art, and more specifically to a new and useful system using radiation, such as beta backscatter, for the automatic measurement of coating thicknesses on continuously moving strip, band and similar material.

The beta backscatter radiation technique for measuring ultra thin coating thicknesses is well known, being disclosed in U.S. Pat. No. 3,132,248, among others, and various types of apparatus have been developed for use in conjunction therewith. Often the workpiece is placed on a measuring table which has an apertured support for the workpiece in operative alignment with a radiation source and detector. See, for example, U.S. Pat. No. 3,115,577. Where it is either impractical or impossible to position the workpiece on such a table, a portable measuring probe is used, the portable probe being positioned either directly on the workpiece or on a separate supporting surface for such workpiece. U.S. Pat. No. 3,529,158 shows one type of portable probe.

Often it is desirable to measure the coating thickness on a continuously moving strip or band of material, for example as the coated material comes from the coating apparatus. This permits appropriate adjustments to be made in the coating process or apparatus, while the coated material is being produced. However, the measurement of moving material presents obvious problems, and is made more difficult when the material being measured is of an interrupted nature, for example a strip of semi-conductor contacts, because of the required positioning of the measuring probe relative to the segmented material under test if accurate measurements are to be obtained. Different systems have been proposed to accomplish this.

In one such system the plated strip is guided onto a measuring wheel which rotates continuously with the strip. The wheel carries one or more measuring probes in operative contact with the strip coating on the wheel. This system has limitations because of wheel diameter size, speed of travel, and accurate positioning of the moving specimen on the probe(s).

In another such system, the measuring probe is stationary and positioned on one side of a slide block. The strip is moved across the opposite side of the block, being maintained in contact therewith by a continuously rotating hold-down wheel. This system measures the average thickness of the coating over a length of strip during the time required for measurement. Where the strip is interrupted, consisting of a band of plated segments, the measuring system is interrupted during the intervals between segments, limiting the capabilities of the system with respect to travel speed of the strip.

SUMMARY OF THE INVENTION

The primary object of this invention is to provide a system for measuring the coating thickness of continuously moving strip material, including segmented strip material, wherein a measuring probe is selectively engaged with the continuously moving strip material at spaced points therealong, and remains engaged therewith for a preselected time interval, which avoids the limitations imposed by the above-noted prior art examples, and which is capable of operating at high speeds without altering the path of movement of the strip material.

In one aspect thereof, the measuring system of this invention is characterized by the provision of a reciprocating shuttle which is moved forwardly along the path of movement of the material to be measured at a speed less than the speed of the material, which is engaged with the strip material for being moved thereby during the measuring stroke of the shuttle and disengaged therefrom during its return stroke, and which carries a measuring probe selectively adjustable for precise alignment with the areas to be measured and which is brought into operative contact therewith during the measuring stroke of the shuttle.

The foregoing and other objects, advantages and characterizing features will become apparent from the ensuing detailed description of certain illustrative embodiments thereof, taken in conjunction with the accompanying drawings wherein like reference numerals denote like parts throughout the various views.

BRIEF DESCRIPTION OF THE DRAWING FIGURES

FIG. 2 is a front elevational view thereof;

FIG. 3 is a top plan view of the strip sensor for detecting an abnormality in the height of the product, such as splices, for interrupting the measuring cycle and the strip speed sensor for determining the speed of the shuttle drive;

FIG. 4 is a front elevation thereof, on an enlarged scale;

FIG. 5 is an end elevation thereof, taken on line 5—5 of FIG. 2;

FIG. 8 is a top plan view illustrating the lift roller for holding the segmented strip out of driving engagement with the shuttle;

FIG. 9 is a front elevational view thereof;

FIG. 10 is a sectional view taken about on line 10—10 of FIG. 2 showing the shuttle plate hold-down and guide roller assembly;

FIG. 11 is a sectional view taken about on line 11—11 of FIG. 10;

FIG. 12 is a fragmentary top plan view showing the guide mechanism used with a moving strip and indicating the removable clamp used when the strip is not segmented;

FIG. 13 is a fragmentary sectional view taken about on line 13—13 of FIG. 12;

FIG. 14 is a view similar to FIG. 12, but showing the drive and alignment pin arrangement for use with segmented strips;

FIG. 15 is a sectional view taken about on line 15—15 of FIG. 14, the segmented strip being omitted for ease of illustration;

FIG. 16 is a fragmentary detail of the drive pin engaged by a segmented strip;

FIGS. 17, 18 and 19 illustrate different forms of segmented strip material with which the apparatus can be used, another drive and alignment arrangement being indicated in FIG. 18;

FIG. 20 is a detail view illustrating a chain drive for the movable shuttle;

FIG. 21 is a fragmentary section taken on line 21—21 of FIG. 20.

DETAILED DESCRIPTION OF THE ILLUSTRATIVE EMBODIMENTS

Figure 1:
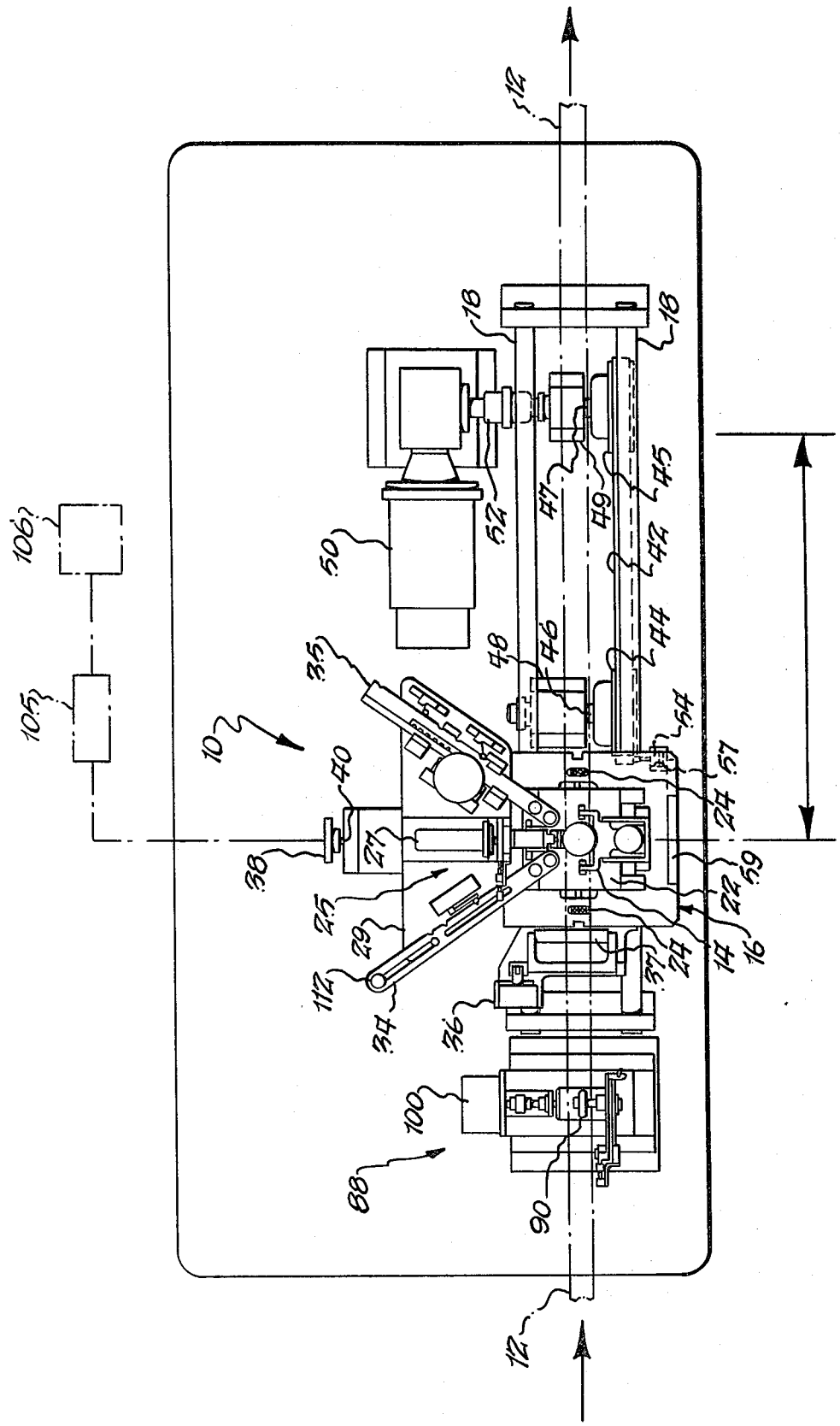
FIG. 1 is a top plan view of an apparatus of the present invention, the arrows at the left and right of the apparatus indicating the direction of travel of the moving strip material and the travel of the reciprocating shuttle being indicated by the arrows immediately beneath the figure.

There is shown in FIG. 1 one embodiment of apparatus generally designated 10 for measurement of coating thickness on a continuous moving strip 12. The coating can be of any material and can be applied by any means, such as electrodeposition, vacuum deposition and autocatalytic deposition. This apparatus can be located anywhere in the path of strip 12. For measurement of an uninterrupted or non-segmented strip 12, the apparatus is intermittently secured to the strip by a hold-down clamp 14. For measurement of a segmented strip, or strips with indexing holes, locating devices such as pins or conforming or mating supports can be used. Apparatus 10 includes a reciprocating shuttle 16 slidably supported by a pair of guide rails 18. Shuttle 16 comprises a base plate 20 carrying, in addition to clamp 14, a strip guide plate 22 for guiding and supporting strip 12 during measurement, and means such as thumb screws 24 for lateral positioning of guide plate 22 on the base plate 20.

A measuring head assembly 25 is carried by shuttle 16 and includes a holder arm 26 (FIG. 7) carrying a mounting element 28 for removably mounting either a suitable aligning device such as a cross hair projection unit (not shown) or a measuring probe 30 containing a GM tube and radioactive isotope source (not shown), both the aligning device and probe being of a type well known in the art and therefore requiring no further description. Measuring head 25 also includes a guide 32 in which holder arm 26 is actuated by motor 27 for vertical positioning of probe 30 relative to strip 12. Measuring head 25 also includes a pair of calibration slides 34, 35, slide 34 being manually operated and slide 35 being automatically operated as described in more detail hereinafter, it being understood that either slide may be omitted if desired.

An elevating roller assembly 36 having an elevating roller 37 is carried by shuttle 16 for raising and supporting strip 12 a preselected distance above guide plate 22 when the shuttle 16 is to be disengaged from strip 12. An additional elevating roller (not shown) may be carried by the shuttle on the opposite side of base plate 20. A coarse adjustment mechanism including thumb wheel 38 and threaded rod 40 is provided for advancing and retracting measuring head mounting plate 29 transversely of the path of strip 12 to adjust the position of probe 30 relative to strip 12.

Shuttle 16 is reciprocated along rails 18 by a conventional endless belt drive arrangement. Endless belt 42 is mounted on a pair of pulleys 44, 45, the latter comprising a one-way clutch, which are mounted on shafts 46, 47 journaled in blocks 48, 49. A conventional drive motor 50 having a safety slip clutch or override mechanism 52 associated therewith drives shaft 47 and with it belt 42. As shown in FIG. 2, belt 42 has a roller 54 carried thereby which is retained in a vertical guide slot 57 located at one end of a guide bracket 59 which is attached at its other end to base plate 20. As drive belt 42 moves, roller 54 pulls shuttle 16 through its reciprocatory cycle, shuttle 16 idling momentarily at the completion of its forward travel and also at the completion of its rearward travel while roller 54 travels vertically downward and vertically upward, respectively, to change the direction of travel of shuttle 16. However, the shuttle is driven by belt 42 at a speed slightly less than the speed of the moving strip, and when strip 12 and shuttle 16 are engaged during forward travel of shuttle 16 the one-way pulley clutch 45 permits moving strip 12 to override the endless belt drive arrangement and pull shuttle 16 forward at the speed of the moving strip. Instead of endless belt 42, a conventional chain drive 55 such as shown in FIGS. 20 and 21, or any other suitable drive means can be used.

Shuttle 16 is held in sliding engagement with rail 18 by conventional pillow or bearing blocks 62 and is guided in precise alignment with rails 18 by a guide roller assembly 56 depending from base plate 20 (FIG. 10) and having a fixed roller 58 riding on one side of outer rail 18 and an eccentrically mounted, adjustable roller 60 engaging the other side of outer rail 18.

A strip guide plate 22 is carried by shuttle 16, and can be adapted for use with particular types of strip 12. The upper surface of guide plate 22 can be configured to conform to the profile of any strip, segmented or unsegmented, to provide support in the area to be measured. The guide plate 22 shown in FIG. 12 is designed for use with an unsegmented continuous strip 12. Guide plate 22 includes a pair of edge guides 64, 64' both of which are selectively adjustable transversely of the strip path to maintain various widths of strips 12 in alignment for measurement as they pass over shuttle 16 on the way to a strip pulling mechanism (not shown). To this end, guides 64, 64' each have a pair of slots 65 receiving screws 65' for securing guides 64, 64' in adjusted position on plate 22. Guides 64, 64' are intended to engage opposite sides of the strip, and are carried by a block 70 releasably secured in a transverse groove in the upper surface of plate 22, as by screws 71.

A pair of spaced removable friction pads 68 are located on opposite sides of block 70, being secured in recesses in guide plate 22 so as to be substantially flush with the upper surface 70" of guide plate 22. Hold down clamp 14 has a pair of spaced clamp pads 72 indicated in phantom in FIG. 12 located in alignment with friction pads 68. As strip 12 travels across guide plate 22 between edge guides 64, 64', guide plate 22, and thus shuttle 16, may be held engaged with strip 12 by clamping strip 12 between clamp pads 72 and friction pads 68 for movement of shuttle 16 by the faster moving strip 12 as will be hereinafter more fully described. During measurement, probe 30 contacts strip 12 in the area bounded by the inner edges 74 of clamp pads 72 and the inner edges of strip guides 64 and 64'.

The guide plate 22 shown in FIG. 14 is adapted for use with continuous segmented strips, the particular strip shown in FIG. 14 being designated 12a and comprising an endless series of fingers 75 or other segments extending from opposite sides of a continuous band. In this embodiment a pair of strip guides 76, which can be like guides 64, 64' and are adjustable transversely of the strip path to accommodate various strip widths, have slots 77 receiving screws 77' for securing them to block 70' on opposite sides of strip 12a. A drive pin 78 and a pair of spaced alignment pins 80, carried by and upstanding from block 70', are positioned between edge guides 76 and spaced from each other in a pattern suitable for engagement with segments 75 of the particular strip with which this guide plate is used. It will be noted that pin alignment patterns or mating guides different from that shown in FIG. 14 may be required for use with differently shaped segmented strips 12b, 12c and 12d shown in FIGS. 17, 18, and 19, respectively.

As shown in FIG. 16, drive pin 78 has a camming surface 82 adjacent an upstanding surface 84, the latter providing a shoulder to be engaged by one side of a strip segment 75 for pulling shuttle 16 in the direction of travel of strip 12a. The camming surface 82 allows the preceding segment 75 of strip 12a to slip over drive pin 78 for positioning the latter in position between segments to be driven by the following segment as more fully described hereinafter. When strip 12a and drive pin 78 are in driving engagement as shown in FIGS. 14 and 16, alignment pins 80 are engaged by segments 75 on the opposite side of the continuous band of the strip 12a for maintaining precise alignment between strip 12a and the probe carrying shuttle.

In operation with a continuous non-segmented strip 12, shuttle 16 has the appropriate guide members 64, 64' attached to block 70 and adjusted so that strip 12 travels between the associated edge guides. Any given point on a moving strip 12 first travels through the combination speed sensor/imperfection sensor station 88 shown in detail in FIGS. 3-5. At station 88 strip 12 travels between a spring loaded sensor wheel 90 mounted on a pivot arm 92 having a pressure foot and roller assembly 94 at one end thereof for actuating a microswitch 96, and a sensor barrel 98 of a conventional tachometer 100. Wheel 90 is held against strip 12 by spring 91, and biases strip 12 against barrel 98, the wheel and barrel and associated parts being mounted on a suitable stand. The sensor barrel 98 is rotated by strip 12 and emits a signal corresponding to the speed of strip 12, which signal is transmitted to an associated speed control mechanism 67 which can be of a type known in the art, and which adjusts the speed of the endless belt drive motor 50 via connection 67' to maintain the speed of belt 42 and shuttle 16 a preselected level below that of the moving strip 12. Mechanism 67 can be adjusted to establish the desired speed differential between strip 12 and motor 50, and operates automatically to maintain the selected differential.

Sensor wheel 90 senses abnormal thickness in the strip 12 due to splices, staples and other abnormalities in the strip, and actuates switch 96 to interrupt the energizing circuit to clamp actuating solenoid 86, preventing the shuttle 16 from being clamped to strip 12 for a pre-determined period after the imperfection has passed under sensor wheel 90. This prevents damage to the measuring probe 30 and abnormal measurements that could result should measuring probe 30 engage the strip in the area in which the staple, splice, or other imperfection is located.

During normal operation, the endless belt drive arrangement moves shuttle 16 at a speed only slightly slower than the speed of strip 12 to accomplish a smooth engagement of shuttle 16 and strip 12 when they are clamped together, thus avoiding any sudden jerking motions. It is for this reason that the speed of the endless belt drive arrangement is automatically adjusted by suitable means to compensate for changes in the speed of the strip 12 as sensed by sensor 98.

Shuttle 16 moves back and forth continuously along a pre-selected portion of rails 18 as determined by the spacing between pulleys 44,45 of the endless belt arrangment. Measurements are made only during the forward travel of shuttle 16 and only when there has been no indication of any abnormality by sensor wheel 90. The shaft of roller 54 is mounted in a bracket 55 attached to endless belt 42, the opposite end of bracket 55 carrying a metal strip 55' having a reflective surface thereon for actuating a photocell 61, (FIG. 2) before shuttle 16 reaches its forwardmost position of travel, at which time the photocell activates solenoid 86 for lifing claim 14, thereby releasing shuttle 16 from strip 12, and activates solenoid 87 for elevating roller 37 to lift strip 12 from the shuttle. Roller 37 is carried by a pivoted bracket 69 which is swung about its pivot axis by solenoid 87 through crank arm 60'. Clamp 14 includes a pivoted plate 15 having arms carrying the clamp pads 72, plate 15 being swung about its pivot axis by solenoid 86. It should be recognized that pneumatic or hydraulic actuators for clamping and unclamping clamp 14 and for raising and lowering roller 37 may be substituted for the solenoids 86, 87. Another reflective surface 58' is provided on roller guide bracket 59 for activating another photocell 61' which activates solenoid 86 for lowering clamp 14 to clamp strip 12 between clamp pads 72 and friction pads 78, and which also activates solenoid 87 to lower roller 37 and strip 12. These photocells 61, 61' also actuate motor 27 to lower and raise the measuring probe 30, the probe being lowered to bring its apertured platen 103 into contact with strip 12 when clampling occurs and being raised out of contact with strip 12 when unclamping occurs. The circuitry for activating solenoids 86 and 87 and motor 27 under control of photocells 61, 61' is of known type and requires no description. It will be appreciated that other photocell arrangements can be used, and that sensors other than photoelectric could be substituted for the above-described arrangement. Platen 103 has a strip engaging face suitably apertured to define the area to be measured, and is releasably secured to the lower end of probe 30 by a threaded collar 103', all in a manner known in the art.

A slight time delay between the clamping of strip 12 and the probe 30 engaging the strip is built into the apparatus to ensure that the shuttle 16 and strip 12 are engaged before probe 30 engages the strip. A coating thickness measurement is made during the time that shuttle 16 and probe 30 are engaged with strip 12. Shuttle 16 will continue to reciprocate without engaging strip 12 as long as sensor wheel 90 continues to indicate that there are imperfections in the strip. Measurements taken by probe 30 are relayed to an appropriate readout mechanism diagramatically indicated at 107 in FIG. 7, which can analyze, store and display this information.

During the initial set-up of shuttle 16 with respect to strip 12, a fine adjustment mechanism comprising a thumb screw 102 connected to an extension 118 of holder bracket 119 is used to advance and retract mounting element 28 laterally of the strip path. Bracket 119 has a guide shaft 120 slidable within a suitable bearing in arm 26. A cross hair projection unit or other alignment device (not shown) is first inserted into element 28 and thumb screw 102 rotated for lining up element 28 with strip 12. In this way, precise alignment of probe 30 held by element 28 and the area to be measured on strip 12 is obtained. The alignment device is then removed from element 28 and the probe 30 inserted, being then in alignment with the area to be measured on strip 12.

Referring now to the operation of the apparatus in conjunction with a segmented strip 12a, it should be recognized that set-up, the operation of the speed sensor/imperfection sensor station 88 and the driving of shuttle 16 by the endless belt arrangement remain identical. However, in this embodiment, claim 14 is removed from base plate 20 and a guide plate arrangement having an appropriate drive and alignment pin or other arrangement is substituted for the guide plate arrangement used with an unsegmented continuous strip. For purposes of this discussion, reference will be made to a guide plate arrangement as shown in FIG. 14.

As shuttle 16 begins its forward travel, photocell 61' is activated, lowering elevating roller 37 to its down position as shown in FIG. 2. The level of strip 12a as it approaches guide plate 22 is slightly beneath the upper surface of the guide plate. Strip 12a therefore is under tension and seats itself on guide plate 22 by means of the first segment that engages the upstanding edge 84 of drive pin 78. Simultaneously, other segments seat against alignment pins 80. Shuttle 16 is then pulled forward by the strip as a result of the engagement of strip 12a and drive pin 78 with one-way clutch 45 permitting override of the endless belt arrangement so that shuttle 16 travels at the faster speed at which strip 12a is moving, i.e. synchronous with strip 12a. Alignment pin 80 can be smaller and shorter than drive pin 78 and act only to avoid misalignment or cocking of strip 12a once drive pin 78 is engaged. A slight delay between the time when elevating roller 37 drops to its down position and the time when probe 30 engages strip 12a is built into the apparatus to ensure that the strip 12a and drive pin 78 are engaged before the probe 30 engages strip 12a. When shuttle 16 approaches the forward limit of its travel as sensed by photocell 61, motor 27 raises probe 30 and solenoid 87 lifts elevating roller 37 which lifts strip 12a up and away from drive pin 78 and alignment pins 80 and maintains this spaced relationship throughout the return cycle of shuttle 16.

While motor 50 is arranged to drive shuttle 16 through its forward cycle at a speed slower than the speed of the moving strip, it will be appreciated that motor 50 and its control can be arranged to drive shuttle 16 at a much faster speed throughout its return cycle, thereby increasing the number of measurements which can be made during a given time period.

In addition camming surface 82 of drive pin 78 is provided so that during normal operation when strip 12a is lowered onto guide plate 22 by roller 37, a segment contacting camming surfce 82 will slide over pin 78 permitting the next following segment to engage the pin.

Other drive and alignment arrangements can be used with segmented strip, one such being shown in FIG. 18. In this arrangement, the guide plate 22 and more specifically block 70' thereon is provided with a pattern of embossments 81 arranged to interfit with the strip segments in the manner of a matching matrix.

Figure 6:
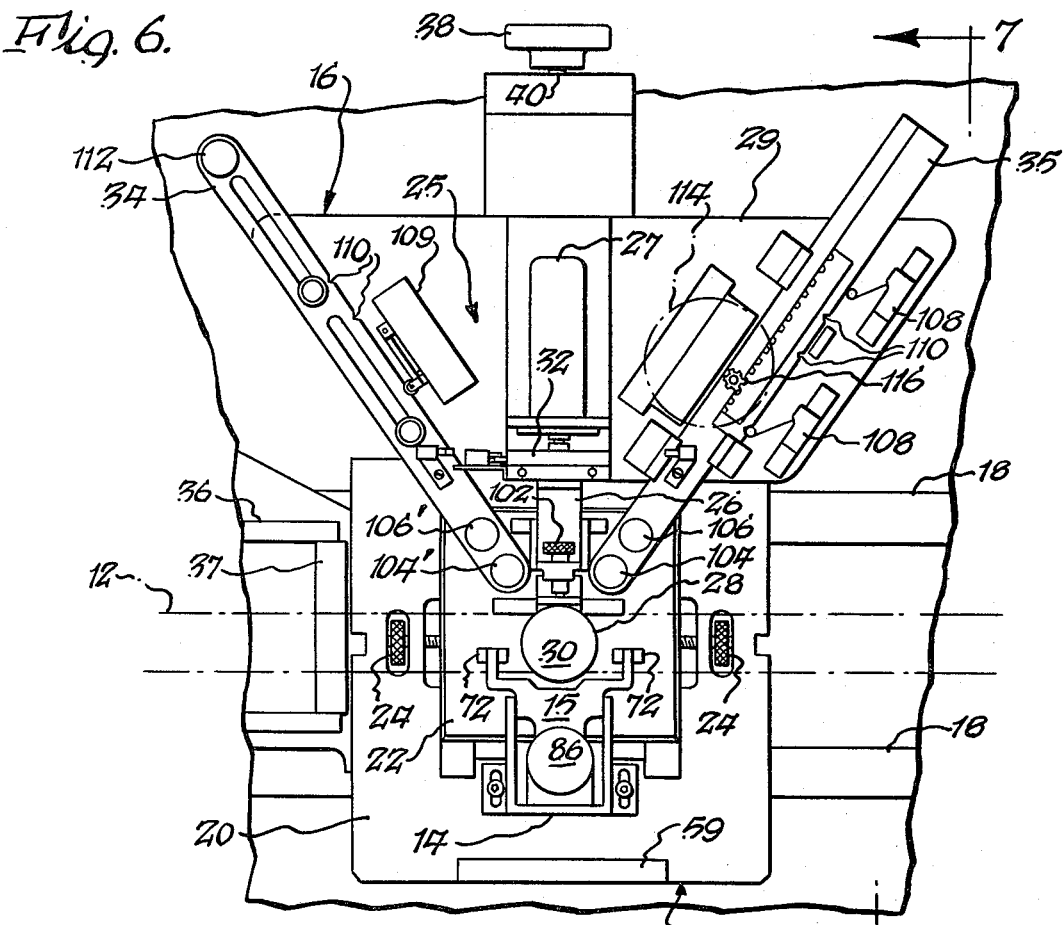
FIG. 6 is a plan view of the reciprocating shuttle with the measuring head and the mechanism for both manual and automatic calibration.
Figure 7:
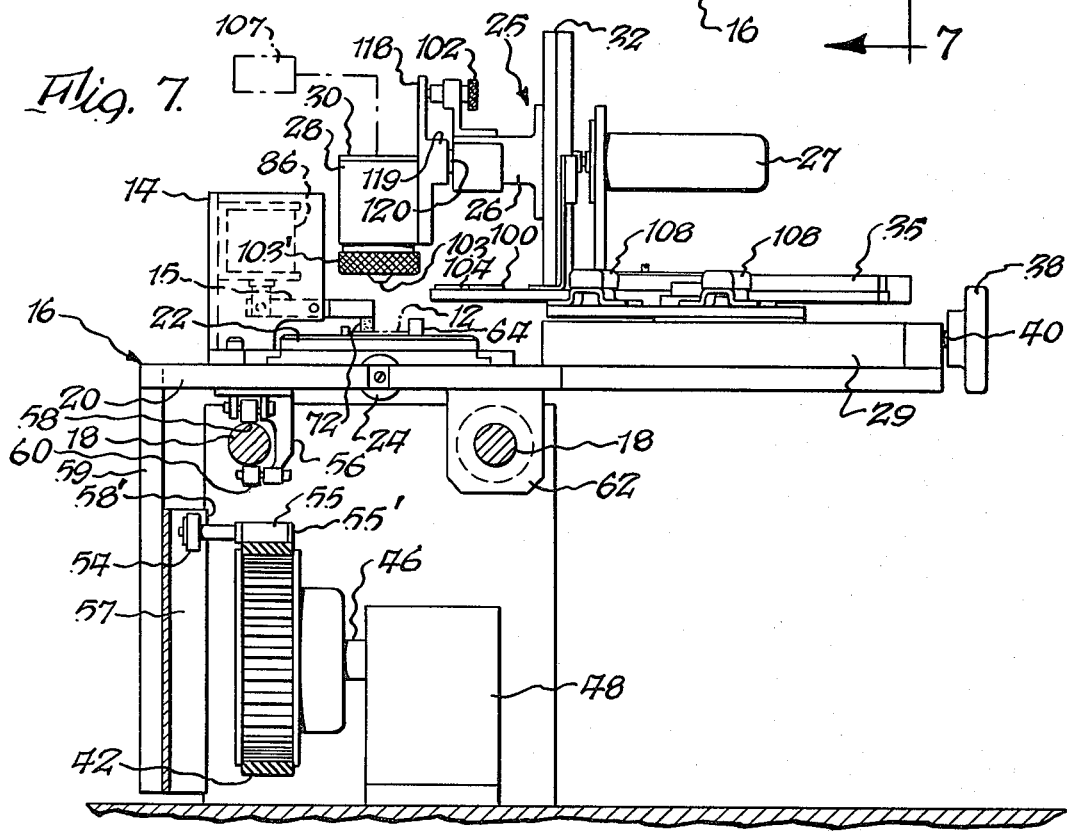
FIG. 7 is an elevational view taken on line 7—7 of FIG. 6.

Calibration of the apparatus 10 is done when initially setting up for operation and from time to time thereafter. This calibration is accomplished utilizing either the manual slide 34 or the automatic slide 35 as shown in FIGS. 6 and 7. Each slide is mounted in horizontal orientation on measuring head mounting plate 29 in angular relation to the other for reciprocating movement permitting them to be individually advanced along paths that intersect at a point in space that is aligned with the apertured opening 103 of probe 30.

Slide 35 has a pair of standards 104, 106 mounted side by side at the forward end of the slide. Standard 104 is the basis material of the strip and standard 106 is the coating material. Limit switches 108 are mounted adjacent slide 35 for cooperating with suitably spaced notches 110 provided along one edge of slide 35 for controlling the positioning of standard plates 104,106 in alignment with probe 30 as the slide is advanced by motor 114, and for limiting the retraction of the slide by motor 114 once calibration has been completed. Slide 34 holds actual thickness standards 104' and 106' and can have a positioning latch 109 engaging notches 110 along one edge thereof. Probe 30 is lowered onto the standard after it has been positioned, and this can be accomplished automatically under control of switches 108.

Slide 34, which would be activated automatically, is advanced and retracted manually by using knob 112 and pushing or pulling slide 34 along its path of travel. Slide 35 is advanced and retracted automatically by a synchronous motor 114 and the associated rack and gear arrangement 116 shown in FIG. 6. Slide 35 is used for automatic recalibration during normal measuring operation of apparatus 10 to make computer controlled periodic checks and recalibration if necessary after a preselected number of measurements. Because temperature, settlement of dust and dirt, isotope decay, and other factors affect the readings of the probe, this checking and recalibration is necessary to ensure measuring consistency and reliability. It should be noted that neither movement of the strip 12, 12a, b or c nor movement of the shuttle 16 is interrupted during this automatic checking/recalibration procedure.

Slides 34,35 are shown in FIG. 6 in their normal position of retraction during the continuous operation of apparatus 10. In this position, slides 34,35 are out of the way of probe 30 and do not interfere with the vertical movement or measurement taking of probe 30.

When it is desired to shift the position of probe 30 relative to strip 12,12a, b or c during operation, for example to take a sequence of measurements in one relative transverse position followed by a sequence of measurements in another relative transverse position, a stepping motor 105 can be operatively connected to threaded rod 40 to automatically, periodically reposition probe 30 under control of a suitably programmed computer 106, as indicated in FIG. 1. Computer 106 can be part of the readout mechanism 107, and can control other functions of the apparatus.

It can be seen from the foregoing discussion and the accompanying drawings that the apparatus of the present invention places no limitations on the speed at which the moving strip travels. The path of the strp need not be altered to conform to the configuration of the measuring apparatus, and since the probe 30 is engaged with the strip 12,12a, 12b,12c during the measuring cycle, a more accurate measurement can be made than if the probe were spaced from the strip. The pass length of the shuttle is designed to provide maximum measurement accuracy within the available space.

It is believed that the invention and its advantages will be fully understood from the foregoing description and it will be apparent that the embodiments described herein are intended to be illustrative only and not limiting as to the invention, the scope of which is intended to be defined in the following claims.

We claim:

1. Apparatus using beta radiation techniques for measuring coating thickness on strip material moving along a predetermined path, said apparatus comprising:
a. a shuttle carrying a measuring probe having a radioactive isotope source and a radiation detection device;
b. drive means for reciprocating said shuttle along a preselected segment of the path travelled by the strip material;
c. means for selectively engaging and disengaging said shuttle and the moving strip, said shuttle being pulled by the strip for synchronous movement therewith during engagement thereof and being driven independently of the strip during disengagement thereof;
d. said drive means moving said shuttle forwardly along said path prior to engagement with the moving strip material to accomplish a smooth engagement of said shuttle with the moving strip; and
e. means for selectively engaging and disengaging said probe with and from the moving strip while said shuttle and the strip are engaged.

2. Apparatus as set forth in claim 1 including means for monitoring the speed of the strip and altering the speed of said shuttle drive means in response to changes in the speed of the strip.

3. Apparatus as set forth in claim 1 including calibration means carried by said shuttle for calibration of the probe both while the strip material is moving and while the strip material is at rest.

4. Apparatus as set forth in claim 1 wherein said means for automatically engaging and disengaging said shuttle and the strip comprises clamping means.

5. Apparatus as set forth in claim 1 wherein the strip comprises a series of spaced apart segments.

6. Apparatus as set forth in claim 5 wherein said means for automatically engaging said shuttle and the strip comprises a locating device positioned on said shuttle.

7. Apparatus as set forth in claim 6, wherein said locating device comprises a plurality of pin members, at least one of said pin members being positioned for engagement with one side of one of the segments for driving said shuttle in synchronization with the strip, and the others of said members being positioned adjacent the other sides of other segments for maintaining alignment of the strip relative to said shuttle.

8. Apparatus as set forth in claim 6, wherein said locating device comprises embossments interfitting with the segments for driving said shuttle in synchronization with the strip and for maintaining alignment of the strip relative to said shuttle.

9. Apparatus as set forth in claim 6 wherein said means for selectively engaging and disengaging said shuttle and the strip comprise elevating means.

10. Apparatus as set forth in claim 7 wherein at least one of said members has a camming surface to provide for positioning of the strip over said member and an upstanding surface adjacent one end of said camming surface for engagement by the strip.

11. Apparatus as set forth in claim 1 wherein said drive means comprises an endless drive and means for translating the motion of said drive into the reciprocation of said shuttle.

12. Apparatus as set forth in claim 11, wherein said translating means comprise a roller attached to said drive and associated with a bracket attached to said shuttle.

13. Apparatus as set forth in claim 1 wherein said measuring probe is removably supported by a holder carried by said shuttle, said holder being adapted to support an alignment device for aligning said holder and thereby said probe with the strip.

14. Apparatus as set forth in claim 13 wherein said shuttle carries coarse and fine adjusting means for aligning said holder with the strip.

15. Apparatus as set forth in claim 13, together with means for moving said probe crosswise relative to the strip during operation.

16. Apparatus as set forth in claim 1, together with means for sensing abnormalities and maintaining said probe and the strip disengaged in response thereto.

17. Apparatus as set forth in claim 1, wherein said drive means moves said shuttle forwardly at a speed slightly slower than that of the moving strip prior to engagement therewith.

18. Apparatus as set forth in claim 17, wherein said drive means moves said shuttle at a much faster speed during its return cycle.

19. Apparatus for measuring coating thickness on strip material moving along a predetermined path, said apparatus comprising:
a. a shuttle carrying a measuring probe having coating thickness sensing means;
b. drive means for reciprocating said shuttle along a preselected segment of the path travelled by the strip material;
c. means for selectively engaging and disengaging said shuttle and the moving strip, said shuttle being pulled by the strip for synchronous movement therewith during engagement thereof and being driven independently of the strip during disengagement thereof;
d. said drive means moving said shuttle forwardly along said path at a spaced slightly slower than that of the moving strip prior to engagement therewith to accomplish a smooth engagement of said shuttle with the moving strip; and
e. means for operatively coupling and uncoupling said probe and the moving strip while said shuttle and the strip are engaged.

20. The method of measuring coating thickness on continuously moving strip material using beta radiation techniques which comprises:
a. reciprocating a shuttle carrying a measuring probe having a radioactive isotope source and a radiation detection device along a preselected segment of the path travelled by the moving strip material;
b. selectively engaging and disengaging the shuttle and the moving strip with the shuttle being pulled by the strip for synchronous movement therewith during engagement thereof and being driven independently of the strip during disengagement thereof;
c. moving the shuttle forwardly along the path prior to engagement with the moving strip material to accomplish a smooth engagement therewith; and
d. selectively engaging and disengaging the probe with and from the moving strip while the shuttle and the strip are engaged.

21. The method of claim 20, wherein the shuttle is moved at a spaced only slightly slower than the strip material prior to engagement therewith.

22. The method of claim 21, wherein the shuttle is moved at a much faster speed during its return cycle.

* * * * *

UNITED STATES PATENT AND TRADEMARK OFFICE
CERTIFICATE OF CORRECTION

PATENT NO. : 4,383,172

DATED : May 10, 1983

INVENTOR(S) : James A. Holler, et al.

It is certified that error appears in the above-identified patent and that said Letters Patent are hereby corrected as shown below:

IN claim 19, subparagraph d, second line, spaced should be -- speed --.

In claim 21, second line, spaced should be -- speed --.

Signed and Sealed this

Seventeenth Day of January 1984

[SEAL]

Attest:

Attesting Officer

GERALD J. MOSSINGHOFF

Commissioner of Patents and Trademarks